(12) United States Patent
Day et al.

(10) Patent No.: US 8,046,354 B2
(45) Date of Patent: Oct. 25, 2011

(54) METHOD AND APPARATUS FOR RE-EVALUATING EXECUTION STRATEGY FOR A DATABASE QUERY

(75) Inventors: Paul Reuben Day, Rochester, MN (US); Lee William Jameson, Rochester, MN (US); Roger Alan Mittelstadt, Byron, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1359 days.

(21) Appl. No.: 10/955,737

(22) Filed: Sep. 30, 2004

(65) Prior Publication Data

US 2006/0074874 A1  Apr. 6, 2006

(51) Int. Cl.
*G06F 17/30* (2006.01)
(52) U.S. Cl. ........... 707/720; 707/713; 706/14; 706/15; 706/45
(58) Field of Classification Search .................. None
See application file for complete search history.

(56) References Cited

U.S. PATENT DOCUMENTS

| | | | | |
|---|---|---|---|---|
| 5,043,872 A * | 8/1991 | Cheng et al. | ....................... | 707/2 |
| 5,089,985 A * | 2/1992 | Chang et al. | ....................... | 707/2 |
| 5,091,852 A * | 2/1992 | Tsuchida et al. | ................... | 707/2 |
| 5,412,806 A * | 5/1995 | Du et al. | ........................... | 707/2 |
| 5,495,608 A * | 2/1996 | Antoshenkov | .................... | 707/3 |
| 5,794,229 A * | 8/1998 | French et al. | ..................... | 707/2 |
| 5,819,255 A * | 10/1998 | Celis et al. | ........................ | 707/2 |
| 6,009,265 A * | 12/1999 | Huang et al. | ...................... | 707/3 |
| 6,108,648 A * | 8/2000 | Lakshmi et al. | .................. | 707/2 |
| 6,112,198 A * | 8/2000 | Lohman et al. | ................... | 707/3 |
| 6,353,826 B1 * | 3/2002 | Seputis | ............................. | 707/5 |
| 6,754,652 B2 * | 6/2004 | Bestgen et al. | .................... | 707/3 |
| 6,763,359 B2 * | 7/2004 | Lohman et al. | ............... | 707/718 |
| 6,782,380 B1 * | 8/2004 | Thede | .................................. | 1/1 |
| 6,789,071 B1 * | 9/2004 | Kapoor et al. | .................... | 707/2 |
| 6,865,567 B1 * | 3/2005 | Oommen et al. | .................. | 707/2 |
| 6,931,395 B2 * | 8/2005 | Day et al. | .......................... | 707/3 |
| 7,031,958 B2 * | 4/2006 | Santosuosso | ...................... | 707/3 |
| 7,136,848 B2 * | 11/2006 | Carlson et al. | .................... | 707/3 |
| 7,383,246 B2 * | 6/2008 | Lohman et al. | ....................... | 1/1 |
| 7,716,215 B2 * | 5/2010 | Lohman et al. | ............... | 707/721 |
| 7,747,606 B2 * | 6/2010 | Dageville et al. | ............. | 707/713 |
| 2003/0187831 A1 * | 10/2003 | Bestgen et al. | .................. | 707/3 |
| 2003/0229639 A1 * | 12/2003 | Carlson et al. | ............... | 707/100 |
| 2004/0220923 A1 * | 11/2004 | Nica | ................................. | 707/3 |
| 2005/0125427 A1 * | 6/2005 | Dageville et al. | ............. | 707/100 |

\* cited by examiner

*Primary Examiner* — Apu Mofiz
*Assistant Examiner* — Hung Le
(74) *Attorney, Agent, or Firm* — Roy W. Truelson

(57) ABSTRACT

A query facility for database queries saves and re-uses query execution strategies, and automatically detects that a strategy should be re-optimized as a result of changes to an indexed variable value. Preferably, the number of records evaluated and selected by the index value condition is dynamically monitored during execution, and an alternative query strategy is initiated when this number appears to be out of proportion to expectations. In an exemplary embodiment, an indexed search strategy is changed to a table scan strategy (or vice versa) as a result of a change to the number of records eliminated by the indexed value, although other examples are possible. Preferably, the query engine initiates an alternative search strategy and concurrently continues to execute the original search strategy as separate threads. Search results are obtained from whichever thread completes first.

19 Claims, 6 Drawing Sheets

METHOD AND APPARATUS FOR RE-EVALUATING EXECUTION STRATEGY FOR A DATABASE QUERY

FIELD OF THE INVENTION

The present invention relates generally to digital data processing, and more particularly to the generation and execution of database queries in a digital computer system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises hardware in the form of one or more central processing units (CPU) for processing instructions, memory for storing instructions and other data, and other supporting hardware necessary to transfer information, communicate with the external world, and so forth. From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed at which a computer system performs day-to-day tasks (also called "throughput") can be increased by making various improvements to the computer's hardware design, which in one way or another increase the average number of simple operations performed per unit of time. The overall speed of the system can also be increased by making algorithmic improvements to the system design, and particularly, to the design of software executing on the system. Unlike most hardware improvements, many algorithmic improvements to software increase the throughput not by increasing the average number of operations executed per unit time, but by reducing the total number of operations which must be executed to perform a given task.

Complex systems may be used to support a variety of applications, but one common use is the maintenance of large databases, from which information may be obtained. Large databases usually support some form of database query for obtaining information which is extracted from selected database fields and records. Such queries can consume significant system resources, particularly processor resources, and the speed at which queries are performed can have a substantial influence on the overall system throughput.

Conceptually, a database may be viewed as one or more tables of information, each table having a large number of entries (analogous to row of a table), each entry having multiple respective data fields (analogous to columns of the table). The function of a database query is to find all rows, for which the data in the columns of the row matches some set of parameters defined by the query. A query may be as simple as matching a single column field to a specified value, but is often far more complex, involving multiple field values and logical conditions.

To support queries, a database typically includes one or more indexes for some of the database fields. An index is a sorting of the records in one of the database tables according to the value of a corresponding field. For example, if the database table contains records about people, one of the fields may contain a birthdate, and a corresponding index contains a sorting of the records by birthdate. If a query requests the records of all persons born before a particular date, the sorted index is used to find the responsive records, without the need to examine each and every record to determine whether there is a match. A well-designed database typically contains a respective index for each field having an ordered value which is likely to be used in queries.

Execution of a query involves retrieving and examining records in the database according to some search strategy. For any given logical query, not all search strategies are equal. Various factors may affect the choice of optimum search strategy. In particular, where a logical AND (or logical OR) of multiple conditions is specified, the sequential order in which the conditions are evaluated and the use of indexes can make a significant difference in the time required to execute the query.

If one of the conditions in a query having multiple conditions involves an indexed value, it is often, although not necessarily always, advantageous to use the index to identify a subset of records to be examined, and to examine only those records. As a simple example, suppose a query contains two conditions, A and B, conjoined by a logical AND, in which condition A involves comparing an indexed value to a constant. By accessing the index, it is possible to determine a subset of records which satisfy condition A, without the need to retrieve and examine all the records. This subset is typically obtained from a portion of the index as a form of sorted list. It is then possible to retrieve and examine each record on the sorted list to determine whether the record satisfies condition B. This type of execution strategy is referred to herein as an "index search".

In the above example, it would alternatively be possible to retrieve each and every record in the database table, to determine whether it satisfies one of the conditions (e.g., condition A), and if so, to determine whether it also satisfies the other condition. This type of execution strategy is referred to herein as a "table scan".

In general, the total number of records retrieved and examined will be fewer in the case of an index search, so it may appear that such a search would always be faster, or at least as fast. However, this is not always the case. When performing an index search, records are accessed in the indexed order, which is unrelated to the way in which the records are stored on a storage device, such as a rotating magnetic disk drive. Thus, from the standpoint of storage location, the order of record access is more or less random. On the other hand, when performing a table scan, records are retrieved in an order related to the way in which they are stored, to optimize storage accesses. E.g., records will typically be retrieved in sequentially addressed blocks of storage. If a single block (the smallest unit of I/O) contains multiple records, all records are retrieved at the same time and examined sequentially. Sequential blocks of storage are quickly accessed from a conventional disk drive data storage device, because there is generally little or no latency and seek time. Moreover, because sequential access is predictable, it is possible to access blocks from storage in advance of CPU need. As a result of these factors, the average amount of system resource required to retrieve and examine each record is significantly less in the case of a table scan than it is in the case of an index search.

In many cases, such as that of the simple example above, whether an index search is more efficient than a table scan will depend on the number of records eliminated from consideration by the index. In the simplified example above, if condition A is false for 99% of the records, then an index search will require that only 1% of the records be retrieved and examined for satisfaction of condition B. In this case, the index search is probably faster, notwithstanding the fact that the random nature of the access requires more resource per record examined. But if condition A is false for only 10% of the records, then a table search is probably faster, because the efficiencies of sequential access will outweigh the fact that slightly more records have to be examined.

To support database queries, large databases typically include a query engine which executes the queries according to some automatically selected search strategy, using the known characteristics of the database and other factors. Some large database applications further have query optimizers which construct search strategies, and save the query and its corresponding search strategy for reuse. These strategies include, among other things, whether an index search or a table scan will be conducted.

A re-usable query may include one or more imported variable values in its logical conditions. I.e., where the query compares a field of each database record to some value, the query may be written so that the compared-to value is a variable, to be provided ("imported") when the query is invoked for execution. In this manner, the same query can be re-used for multiple possible compared-to values, without the necessity of writing and maintaining separate queries for all possible compared-to values.

As explained above, whether an index search or a table scan is optimum for a given query depends largely on the relative number of records examined. A query optimizer or similar function may generate and save a search strategy for a query based on certain assumptions about the number of records eliminated from consideration by the indexed value. Since the number of records eliminated by the indexed value will depend on the value of the variable to which it is compared, this number could vary considerably for different executions of the same query if the query contains imported variables. A query strategy which is optimized using one variable value will not necessarily be optimal using a different query strategy. This problem can be particularly acute if a search strategy optimized for a particular variable value uses an index search, and, as a result of a change in the variable value, relatively few records are eliminated from consideration, resulting in an index search which evaluates almost the entire database table.

It would be possible to simply re-optimize a query every time it is executed, but this involves considerable overhead. If intelligent determinations could be made to automatically re-evaluate the execution strategies of queries under certain conditions, particularly where the relative number of records eliminated by an indexed value changes, the execution performance of such queries could be improved. A need therefore exists, not necessarily recognized, for an improved database query engine or optimizer which can automatically make intelligent choices in determining when to re-evaluate the execution strategies of certain queries.

SUMMARY OF THE INVENTION

A query engine (or optimizer) which supports database queries saves and re-uses query execution strategies, and automatically detects that a strategy should be re-optimized as a result of changes to an indexed variable value.

In an exemplary embodiment described herein, the query engine (or optimizer) changes from an index search strategy to a table scan strategy (or vice versa) as a result of a change to the number of records eliminated by the indexed value. However, the present invention is not limited to switching between an index search strategy and a table scan strategy, and there are other applications for re-optimizing a query strategy as described herein.

In the preferred embodiment, the query engine monitors the number of records evaluated and selected by the index value condition during execution of the query, and dynamically initiates an alternative query strategy when this number appears to be out of proportion to expectations. In the case of an index search strategy, the system maintains a "high water mark" of the maximum number of selected records which were expected, and if this number is exceeded during execution, the alternative (table scan) strategy is attempted. In the case of a table scan strategy, the system maintains a "low water mark" of the minimum number of selected records. Once or more during execution, the number selected is extrapolated based on the total number in the database, and if the minimum number is not met, the alternative (index search) strategy is attempted.

In the preferred embodiment, the query engine initiates an alternative search strategy and concurrently continues the original search strategy, the two strategies executing as separate and independent threads. Search results are obtained from whichever thread completes first, and the other thread is terminated. It would alternatively be possible to select only one strategy in this instance, and to execute the selected strategy.

By dynamically and automatically altering the execution strategy of queries where it appears that the assumptions upon which a strategy was optimized are erroneous, the selection of an optimal search strategy is improved, thus improving the utilization of computer resources and/or response time to the requestor. Although the selection according to the preferred embodiment is not necessarily perfect, and may result in some duplication of resource, certain worst case scenarios involving the use of sub-optimal search strategies are avoided at a relatively small cost in system overhead.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
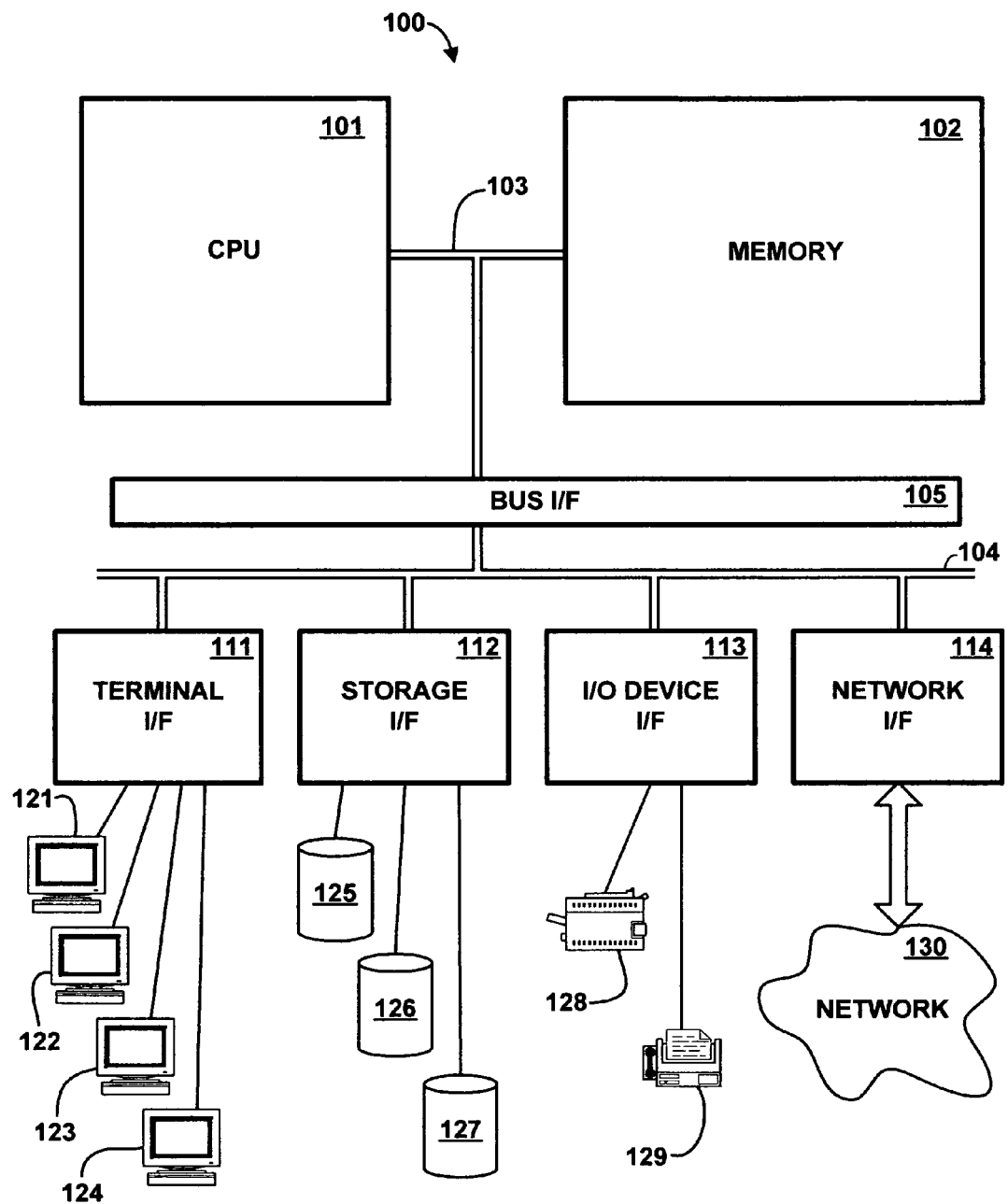
FIG. 1 is a high-level block diagram of the major hardware components of a computer system for executing database queries and dynamically re-evaluating query execution strategy, according to the preferred embodiment of the present invention.

Referring to the Drawing, wherein like numbers denote like parts throughout the several views, FIG. 1 is a high-level representation of the major hardware components of a computer system 100 for use generating and executing database queries, optimizing query strategies, and dynamically re-evaluating query execution strategies, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

Memory bus 103 provides a data communication path for transferring data among CPU 101, main memory 102 and I/O bus interface unit 105. I/O bus interface 105 is further coupled to system I/O bus 104 for transferring data to and from various I/O units. I/O bus interface 105 communicates with multiple I/O interface units 111-114, which may also be known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPU 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
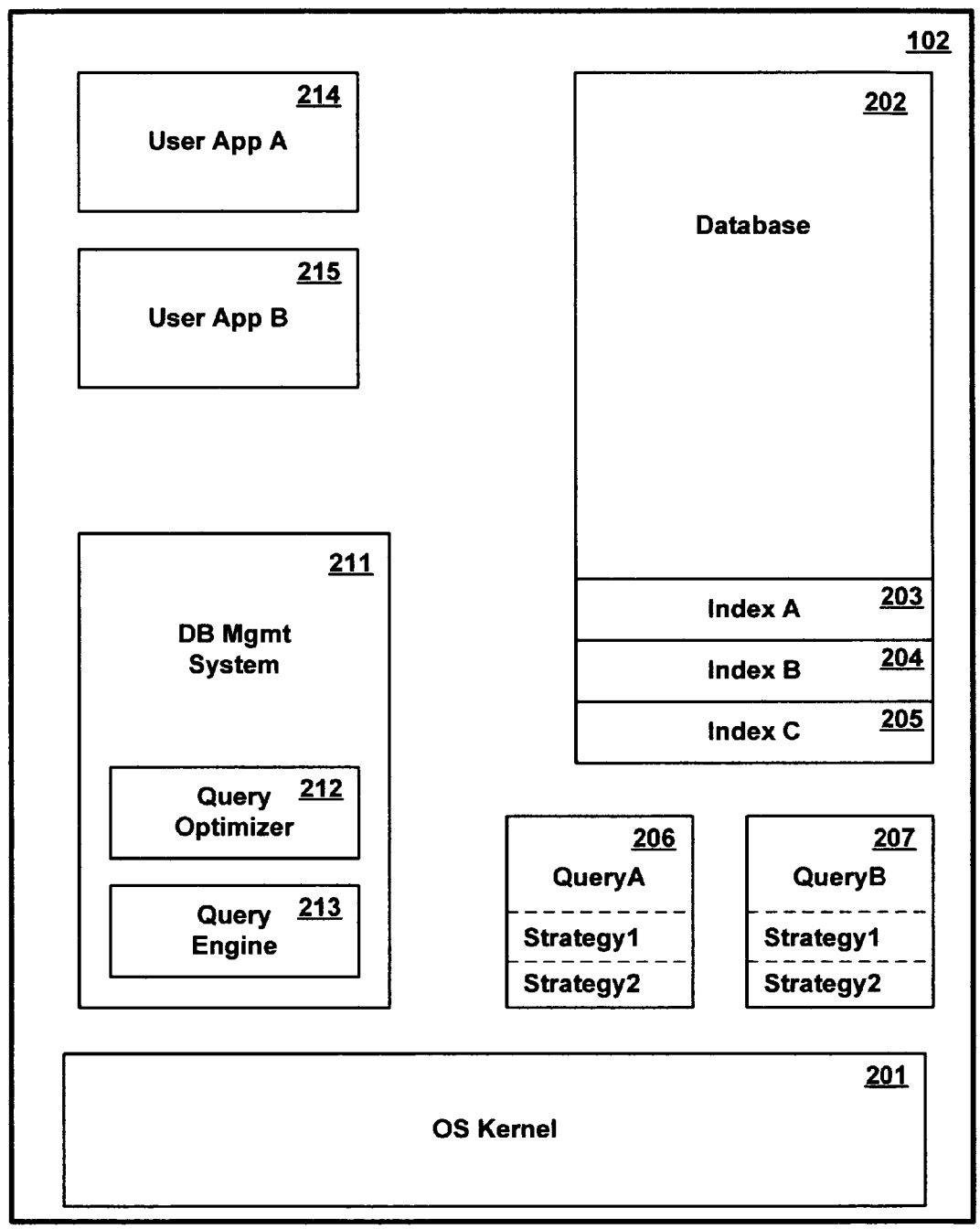
FIG. 2 is a conceptual illustration of the major software components of a computer system for executing database queries and dynamically re-evaluating query execution strategy, according to the preferred embodiment.

FIG. 2 is a conceptual illustration of the major software components of system 100 in memory 102. Operating system 201 provides various low-level software functions, such as device interfaces, management of memory pages, management and dispatching of multiple tasks, etc. as is well-known in the art. A structured database 202 contains data which is maintained by computer system 100 and for which the system provides access to one or more users, who may be directly attached to system 100 or may be remote clients who access system 100 through a network using a client/server access protocol. Database 202 contains one or more tables, each having a plurality of records, each record containing at least one (and usually many) fields, as is well known in the art. Database 202 might contain almost any type of data which is provided to users by a computer system. Associated with database 202 are multiple database indexes 203-205, each index representing an ordering of records in database 202 according to some specified criterion. Although only one database 202 and three indexes 203-205 are shown in FIG. 2, the computer system may contain multiple databases, and the number of indexes may vary (and typically is much larger).

Alternatively, database 202 on system 100 may be logically part of a larger distributed database which is stored on multiple computer systems.

Database management system 211 provides basic functions for the management of database 202. Database management system 211 may theoretically support an arbitrary number of databases, although only one is shown in FIG. 2. Database management system 211 preferably allows users to perform basic database operations, such as defining a database, altering the definition of the database, creating, editing and removing records in the database, viewing records in the database, defining database indexes, and so forth. Among the functions supported by database management system 211 is the making of queries against data in database 202. Query support functions in database management system 211 include query optimizer 212 and query engine 213. Database management system 211 may further contain any of various more advanced database functions. Although database management system 211 is represented in FIG. 2 as an entity separate from operating system kernel 201, it will be understood that in some computer architectures various database management functions are integrated with the operating system.

Query optimizer 212 generates query execution strategies for performing database queries. As is known in the database art, the amount of time or resource required to perform a complex query on a large database can vary greatly, depending on various factors, such as the availability of an index, the amount of resources required to evaluate each condition, and the expected selectivity (i.e., number of records eliminated from consideration) of the various logical conditions. Optimizer 212 determines an optimal execution strategy according to any optimizing algorithm, now known or hereafter developed, and generates an execution strategy, also known as an "access plan", according to the determination. The execution strategy is a defined series of steps for performing the query, and thus is, in effect, a computer program. The optimizer 212 which generates the execution strategy performs a function analogous to that of a compiler, although the execution strategy data is not necessarily executable-level code. It is, rather, a higher-level series of statements which are interpreted and executed by query engine 213.

A query can be saved as a persistent storage object in memory, and can be written to disk or other storage. Once created by optimizer 212, a query execution strategy can be saved with the query as part of the persistent storage object. For a given query, it is possible to generate and save one or multiple optimized execution strategies. The query can be invoked, and a saved query strategy re-used (re-executed), many times.

FIG. 2 represents persistent storage objects Query A 206 and Query B 207. Query objects are described in further detail herein, with respect to FIG. 4. Although two query objects, each containing two execution strategies, are represented for illustrative purposes in FIG. 2, it will be understood that the actual number of such entities may vary, that typically a large computer system contains a much larger number of query objects, that each query object may contain or be associated with zero, one, two, or more than two execution strategies. Although these are referred to herein as "query objects", the use of the term "object" is not meant to imply that database management system 211 or other components are necessarily programmed using so-called object-oriented programming techniques, or that the query object necessarily has the attributes of an object in an object-oriented programming environment, although it would be possible to implement them using object-oriented programming constructs.

In addition to database management system 211, one or more user applications 214, 215 executing on CPU 101 may access data in database 202 to perform tasks on behalf of one or more users. Such user applications may include, e.g., personnel records, accounting, code development and compilation, mail, calendaring, or any of thousands of user applications. Some of these applications may access database data in a read-only manner, while others have the ability to update data. There may be many different types of read or write database access tasks, each accessing different data or requesting different operations on the data. For example, one task may access data from a specific, known record, and optionally update it, while another task may invoke a query, in which all records in the database are matched to some specified search criteria, data from the matched records being returned, and optionally updated. Furthermore, data may be read from or written to database 202 directly, or may require manipulation or combination with other data supplied by a user, obtained from another database, or some other source. Although two applications 214, 215 are shown for illustrative purposes in FIG. 2, the number of such applications may vary. Applications 214, 215 typically utilize function calls to database manager 211 to access data in database 202, and in particular, to execute queries to data in the database, although in some systems it may be possible to independently access data in database 202 directly from the application.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 2, it will be understood that the actual number of such entities may vary, and in particular, that in a complex database server environment, the number and complexity of such entities is typically much larger. Additionally, although software components 202-207 and 211-215 are depicted in FIG. 2 on a single computer system 100 for completeness of the representation, it is not necessarily true that all programs, functions and data will be present on a single computer system or will be performed on a single computer system. For example, user applications may be on a separate system from the database; a database may be distributed among multiple computer systems, so that queries against the database are transmitted to remote systems for resolution, and so forth.

While the software components of FIG. 2 are shown conceptually as residing in memory 102, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. In particular, database 202 is typically much too large to be loaded into memory, and typically only a small portion of the total number of database records is loaded into memory at any one time. The full database 202 is typically recorded in disk storage 125-127. Furthermore, it will be understood that the conceptual representation of FIG. 2 is not meant to imply any particular memory organizational model, and that system 100 might employ a single address space virtual memory, or might employ multiple virtual address spaces which overlap.

Figure 3:
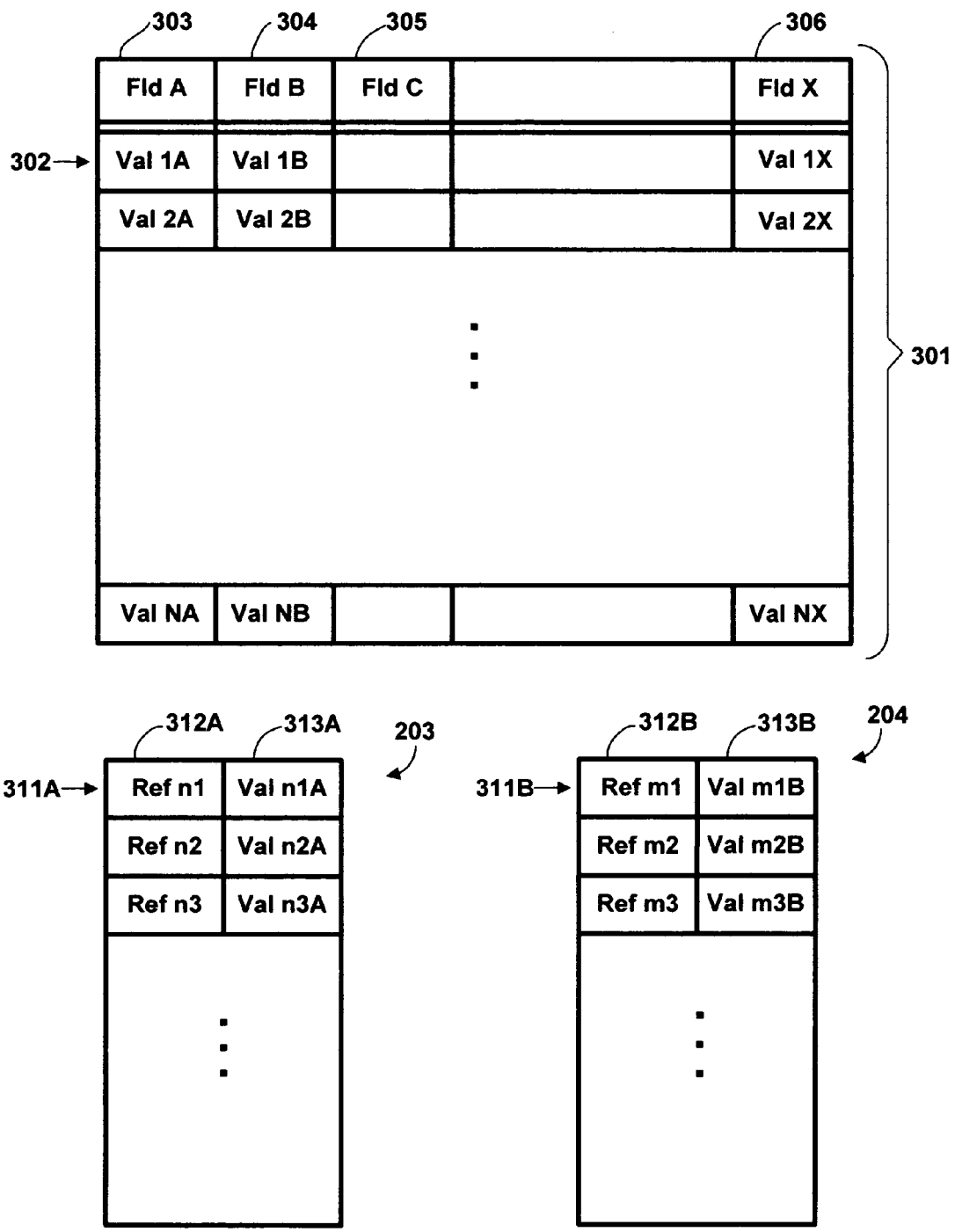
FIG. 3 is a conceptual representation of the structure of a database and associated database indexes upon which queries are performed, according to the preferred embodiment.

FIG. 3 is a conceptual representation of the structure of database 202 and database indexes 203, 204 associated with tables in database 202, containing data which can be analyzed by executing a logical query, according to the preferred embodiment. Database 202 comprises one or more database tables 301 (of which only one is shown in FIG. 3). Each table contains multiple database records 302, each record containing multiple data values logically organized as multiple data fields 303-306. Database 202 is conceptually represented in FIG. 3 as a table or array, in which the rows represent database records, and the columns represent data fields. However, as is well known in the art, the actual structure of the database in memory typically varies due to the needs of memory organization, accommodating database updates, and so forth. A database will often occupy non-contiguous blocks of memory; database records may vary in length; some fields might be present in only a subset of the database records; and individual records may be non-contiguous. Portions of the data may even be present on other computer systems. Various pointers, arrays, and other structures (not shown) may be required to identify the locations of different data contained in the database.

Because database 202 may contain a very large number of records, and it is frequently necessary to access these records in some logical (sorted) order, database indexes 203-205 provide a pre-sorted ordering of the database table records according to some logical criterion. Typically, an index sorts the database according to the value of a specific field or fields, the field(s) being used to sort the database varying with the index. FIG. 3 represents two indexes 203, 204, where index 203 sorts database records according to the value of field A 303, and index 204 sorts database records according to the value of field B 304.

Conceptually, each index contains a plurality of entries 311A, 311B (herein generically referred to as feature 311), each entry 311 corresponding to a respective entry 302 in a database table 301, and containing a reference 312A, 312B (herein generically referred to as feature 312) and a value 313A, 313B (herein generically referred to as feature 313). The reference 312 is a reference to the corresponding entry 302 in database table 301. A reference could be a pointer, array index, record number, etc., which enables one to identify and access the corresponding database entry. The value 313 is the value from the field sorted by the index for the corresponding database entry. E.g., for index 203, which sorts database records according to the value of field A 303, the value 313A is the value of field A 303 for each corresponding database record. For an index, the entries are sorted so that values 313 are in a sorted order. Although indexes 203, 204 are represented conceptually in FIG. 3 as tables or arrays, a different structure, such as a binary tree, is typically used due to the need to update the indexes responsive to database updates, and to quickly identify the location of a desired value in the sorted order.

Figure 4:
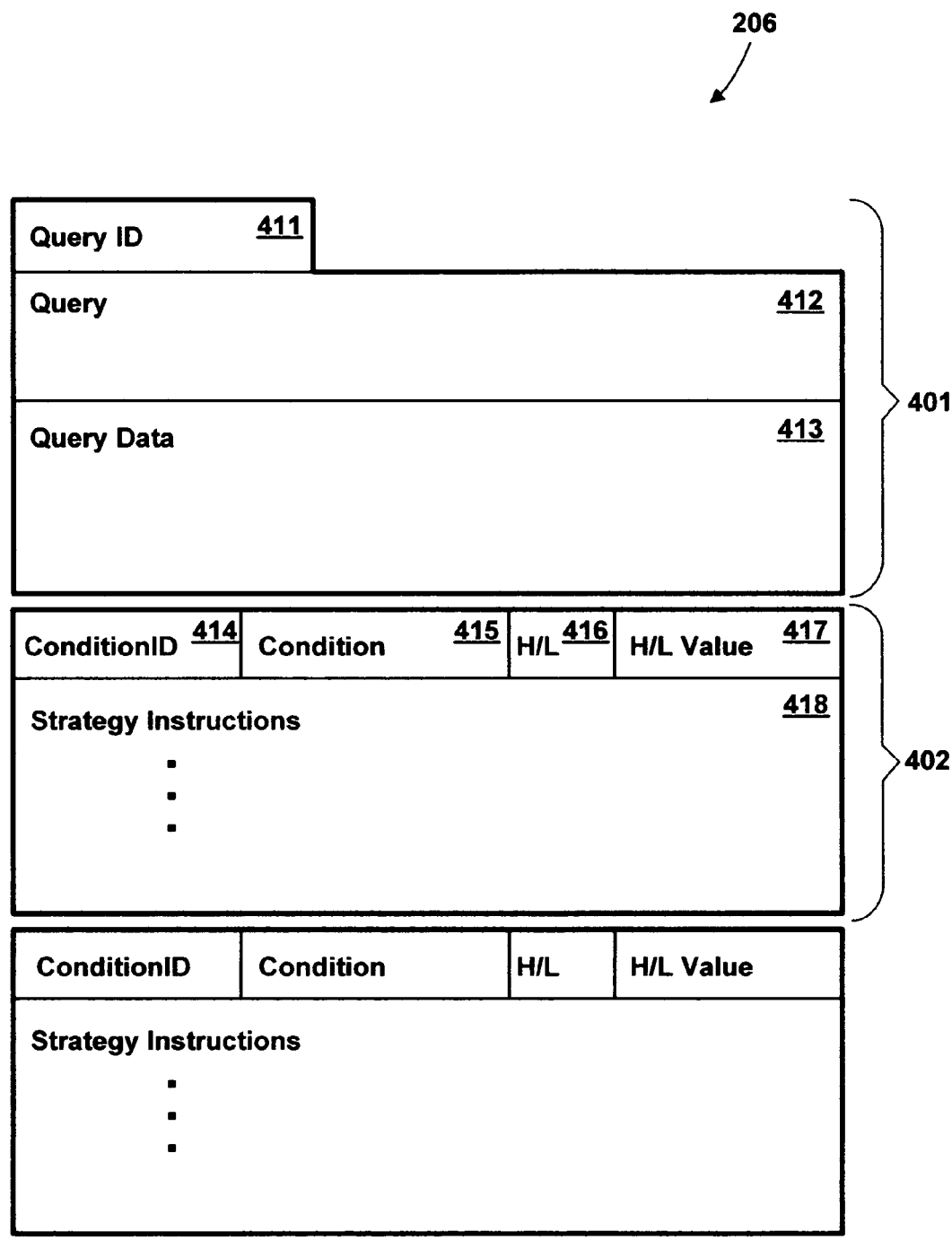
FIG. 4 is a conceptual representation of a persistent query object, according to the preferred embodiment.

FIG. 4 is a conceptual representation of a typical persistent query object 206, according to the preferred embodiment. A query object contains a body portion 401, and zero, one or multiple execution strategy blocks 402 (of which two are represented in the example of FIG. 4). The body portion contains a query identifier field 411, a query logical representation 412, and additional query data 413. The query logical representation 412 is a representation of the query in a form understandable by the query optimizer 212 and/or query engine 213, from which a query execution strategy can be constructed. Additional query data 413 includes various other data which might be useful to database management system 211 or other applications accessing a query. For example, additional data 413 might include a text description of the query, performance statistics for running the query, security and access control information, and so forth. Additional query data 413 is represented in FIG. 4 as a single block of data for clarity of illustration; however, such additional data will typically comprise multiple fields, some of which may be optional or of variable length, or may reference data in other data structures.

Execution strategy block 402 contains data relating to a particular execution strategy for the query. Because there may be multiple execution strategies for a single query, there may be multiple execution strategy blocks. All execution strategies are valid algorithms for satisfying the query, and will therefore produce identical sets of records which satisfy the query conditions. However, the resources required for executing different strategies may vary. Each strategy block contains a query condition identifier 414, a strategy condition 415, an H/L flag 416, H/L value 417, and a set of strategy instructions 418.

Query condition identifier 414 identifies the condition from the subject query which controls the use of the execution strategy associated with the execution strategy block. I.e., the execution strategy is deemed optimal for use, based on some assumption about the number of records selected by the query condition identified in query condition identifier 414. In a simple embodiment, the query condition identifier identifies only a single condition, although it would alternatively be possible to identify multiple conditions.

Strategy condition 415 specifies the condition(s) for which the corresponding strategy is deemed optimal. I.e., if the query was optimized using certain assumptions about the values of one or more imported variables in the query condition, these assumptions are expressed in the strategy condition 415. Strategy condition 415 will also include any conditions subsequently executed using the strategy and for which the strategy is determined to be optimal, as explained further herein. In a simple embodiment, the strategy condition 415 contains an identifier of an imported variable and corresponding value(s). The value of an ordered variable will generally be expresses as greater than or equal to (or less than or equal to) some quantity for which the strategy is deemed optimal. An enumerated variable will simply list all known values for which the strategy is deemed optimal. However, the strategy condition 415 could be more complex, could contain multiple imported values, or other conditions.

H/L value field 417 is a high (or low) water mark indicated the maximum (or minimum) number of records for which the strategy is deemed optimal. I.e., the query is deemed optimal if no more (in the case of a high water mark) or no fewer (in the case of a low water mark) than the number of records indicated are selected by the condition identified by query condition identifier 414. H/L value field could be expressed as an integer indicating a number of records, or as a proportion of the total number in the database, or in any other useful representation. H/L flag 416 is a flag indicating whether H/L value field 417 is considered a high or low water mark.

Strategy instructions 418 are instructions for executing the corresponding strategy. In the preferred embodiment, these are not directly executable code, but are higher-level instructions which are interpreted by the query engine 213 to execute the query. These instructions determine whether or not indexes are used to search the database records and the order in which conditions are evaluated.

Among the functions supported by database management system 211 is the making of queries against data in database 202, which are executed by query engine 213. As is known, queries typically take the form of statements having a defined format, which test records in the database to find matches to some set of logical conditions. Typically, multiple terms, each expressing a logical condition, are connected by logical conjunctives such as "AND" and "OR". Because database 202 may be very large, having a very large number of records, and a query may be quite complex, involving multiple logical conditions, it can take some time for a query to be executed against the database, i.e., for all the necessary records to be reviewed and to determine which records, if any, match the conditions of the query.

The amount of time required to perform a complex query on a large database can vary greatly, depending on many factors. Depending on how the data is organized and indexed, and the conditions of the query, it may be desirable to evaluate all of the records (a table scan strategy) or to evaluate some subset of records which satisfy one of the conditions, the subset being produced by comparing the condition to the corresponding index 203-205 (an index search strategy). For example, if a query contains a set of condition terms connected by logical AND conjunctives and one assumes sequential evaluation of terms, then a first term to be evaluated must be evaluated against all records in a database table, but a second or subsequent term to be evaluated must only be evaluated against those records for which the first term evaluated to "true". If the first term involves an indexed field, the subset of records which satisfy the first term condition can be determined by accessing the index, without accessing the records themselves. Terms subsequent to the first are then evaluated only for the subset of records determined by the index. If this subset is sufficiently small, an index search can save a lot of time. However, if relatively few records are eliminated from consideration by the index (i.e., the subset of records generated from the index is some substantial portion of the whole database), then an index search can result in much worse performance than a table scan. These and other considerations should be taken into account in selecting an optimum query execution strategy.

It will be noted that logical condition terms joined by the conjunctive "OR" can be converted to conditions joined by "AND" by negating the conditions, and again negating the logical conjunction of the conditions, and therefore similar principles apply. Furthermore, multiple conditions could be combined by a conjunctive to form a single condition which is part of a larger set of conditions at a different level of nesting. Well known techniques exist for dissecting queries involving combinations of different conjunctions and different nesting levels.

Figure 5A:
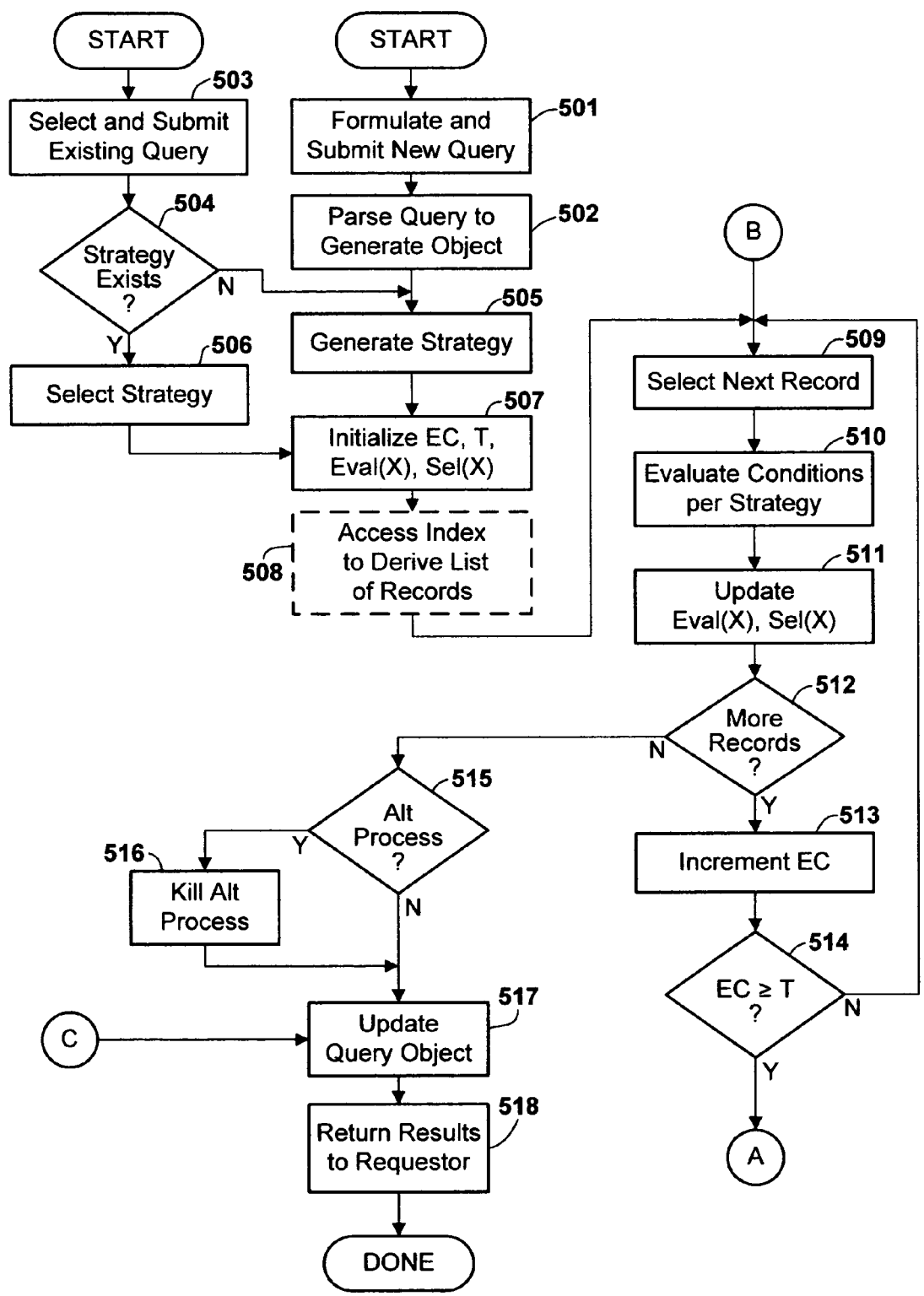
FIGS. 5A and 5B (herein collectively referred to as FIG. 5) are a flow diagram illustrating at a high level the process of executing a database query, according to the preferred embodiment.
Figure 5B:
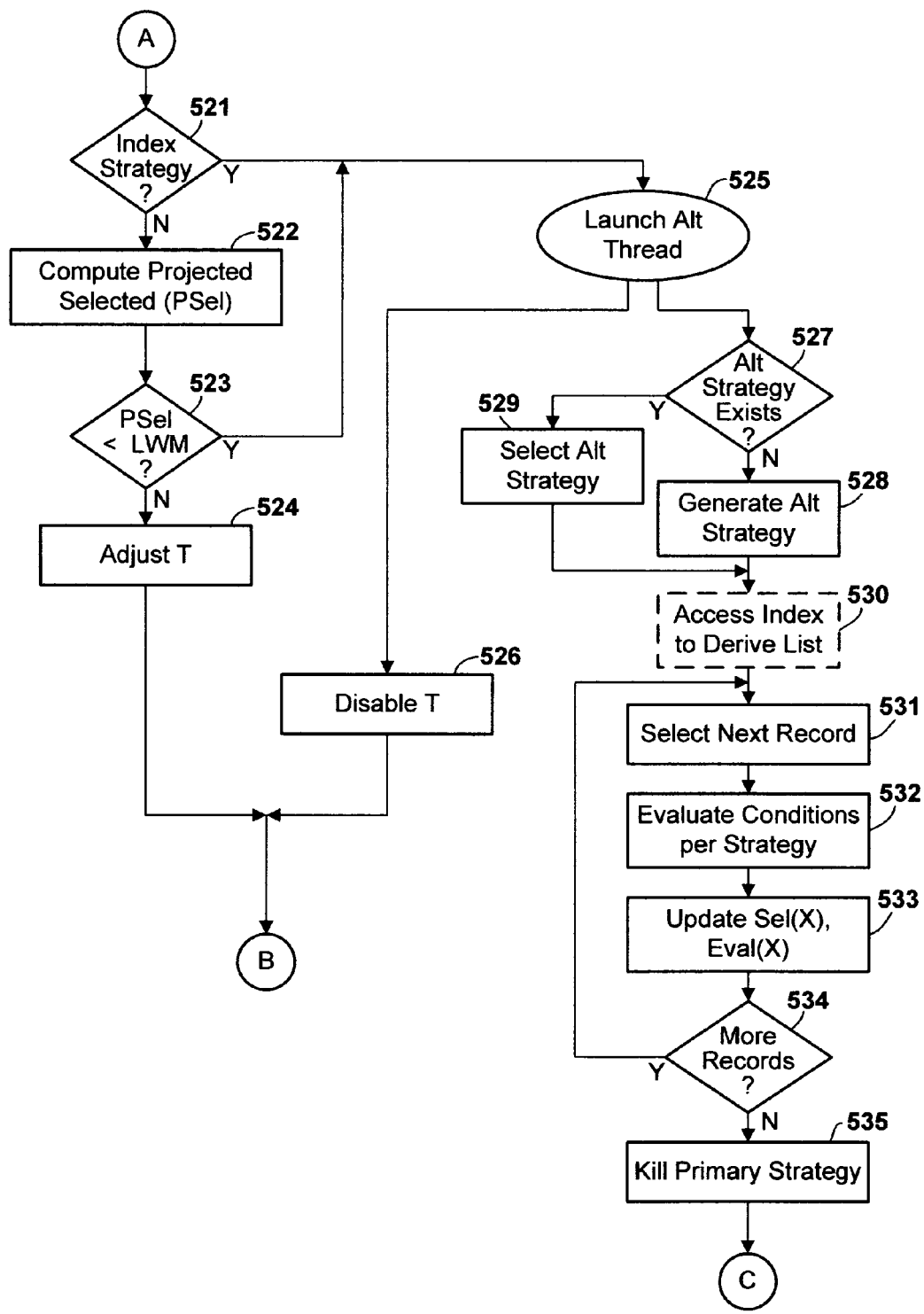

In accordance with the preferred embodiment, query engine 213 executes logical queries of database 202 using strategies generated by optimizer 212. A query may be saved, along with one or more strategies for its execution. The query engine therefore chooses an existing strategy for execution, or calls the optimizer to generate one. With each strategy, there is associated a high (or low) water mark representing a maximum (or minimum) number of records to be evaluated using the strategy. During execution, the query engine monitors the number of records evaluated. If the high water mark is exceeded, or if it is projected that the low water mark will not be met, then an additional thread is initiated for executing the query using an alternative strategy. The two threads execute in parallel until one finishes. The strategy used by the first thread to finish is then deemed the correct strategy for subsequent queries involving the same input values. FIGS. 5A and 5B (herein collectively referred to as FIG. 5) are a flow diagram illustrating at a high level the process of executing a database query, according to the preferred embodiment.

Referring to FIG. 5, a query may be initiated either as a newly defined query, or as a re-used (previously executed and saved) query, as shown by the two paths beginning at blocks 501 and 503, respectively. In general, it is expected that the dynamic strategy re-evaluation technique of the present invention is most useful for previously used queries, although there could be environments in which a new query is optimized under conditions in which the optimizer does not know imported values to be used or other data, which would make the technique described herein useful for new queries as well.

For a new query, a requesting user formulates and submits a database query using any of various techniques now known or hereafter developed (step 501). E.g., the database query might be constructed and submitted interactively using a query interface in database management system 211, might be submitted from a separate interactive query application program, or might be embedded in a user application and submitted by a call to the query engine 213 when the user application is executed. A query might be submitted from an application executing on system 100, or might be submitted from a remote application executing on a different computer system.

In response to receiving the query, query engine 213 parses the query into logical conditions to generate a query object (step 502), which may be saved for re-use. The query engine invokes optimizer 212 to generate an optimized execution strategy for the query (step 505). Preferably, this optimized strategy is also saved as a strategy block 402 with the query object.

Where an existing query is re-used, a requesting user selects the existing query object for re-use and invokes it, using any of various techniques now known or hereafter developed (step 503). E.g., the query might be selected interactively from a menu in database management system 211, might be submitted from a separate interactive application program, or might be embedded in a user application and submitted by a call to the query engine 213 when the user application is executed, any of which might be performed from system 100, or from a remote system.

In response to invoking the query, query optimizer 212 determines whether a suitable saved strategy exists in the query object 206 (step 504). If no suitable strategy exists, the query engine invokes the optimizer to generate one (step 505), as in the case of a new query. If a suitable strategy does exist (the 'Y' branch from step 504), a strategy is selected (step 506). In general, if any strategy has been saved in the query object, it will be selected. Where multiple strategies have been saved in the query object, the query condition identifiers 414 and strategy conditions 415 of the multiple strategies will be compared to the imported values in the invoked query, and a strategy will be selected accordingly. Where none of the strategy conditions match the imported values, the query engine will select one of the strategies (preferably the first listed strategy). In an alternative embodiment, it would be possible to use some intelligent algorithm for selecting an optimal strategy among the saved strategies in this case, and/or in some cases to reject all the saved strategies and generate a new strategy at step 505.

The query engine initializes various local status variables (step 507). In particular, an evaluation loop counter (EC), is initialized to zero. A loop threshold (T) is initialized to a value depending on the strategy used. Where the strategy is an index search, the loop threshold is initialized to the high water mark value associated with the strategy, from H/L value field 417 in the strategy block 402. Where the strategy is a table scan, the loop threshold is initialized to some predetermined sampling value. As explained further herein, when the number of evaluations exceeds the threshold, a branch will be taken to cause the query engine to re-evaluate the strategy. The query engine further initializes arrays of Eval(X) and Sel(X) counters to zero. These counters record, for each of one or more logical conditions, the number of records evaluated and the number of records selected (i.e., for which the condition was satisfied). To support the dynamic re-evaluation of execution strategies in accordance with the preferred embodiment, it is only necessary to maintain Eval(X) and Sel(X) counters for conditions involving indexed record fields compared to an imported variable value; however, such counters might be maintained for different purposes with respect to other conditions.

If the strategy generated at step 505 or chosen at step 506 (the primary strategy) is an index scan, the query engine then accesses the appropriate index and derives a list of records meeting the condition containing the indexed record field. (represented as optional step 508). It is possible that the strategy will use multiple indexes, e.g., by deriving multiple lists corresponding to multiple respective conditions, each containing a respective indexed record field, and logically ANDing (or, in some cases, ORing) the multiple lists. Whether a single index or multiple indexes are used, the result of step 508 is a single derived list containing those database records which satisfy the corresponding indexed condition or conditions.

The query engine then enters an evaluation loop, represented as steps 509-514. With each iteration of the loop, the query engine selects and evaluates one database record with respect to the logical conditions of the query. It also increments loop counter EC. If EC reaches loop threshold T before all records have been examined, then the primary strategy is re-evaluated (as represented in FIG. 5B).

Referring again to FIG. 5, the query engine selects a record for evaluation (step 509). The record selected is the next sequential record in the list of records to be evaluated. Where an index search is used, this list is the list derived in step 508. Where a table scan is used, the list is a fixed list of all database records, arranged in some order (e.g., by storage location) which makes retrieval of the records efficient, as is known in the art.

The query engine then retrieves the selected record and evaluates the logical query conditions with respect to the selected record in an order determined by the strategy (step 510), using any known technique or technique hereafter developed. E.g., for a conjunction of logical ANDs, each successive condition is evaluated until a condition returns "false" (which obviates the need to evaluate any further conditions) or until all conditions are evaluated.

The query engine updates the Eval(X) and Sel(X) arrays by incrementing the corresponding Eval(X) array values for any corresponding conditions which were actually evaluated, and the corresponding Sel(X) values for any conditions which evaluated to "true" (step 511).

If any further records remain to be evaluated, the 'Y' branch is taken from step 512, the evaluation loop counter is incremented (step 513), and the query engine tests whether the loop threshold has been exceeded (step 514). If the threshold is exceeded (the 'Y' branch from step 514), the query engine re-evaluates the primary execution strategy, beginning with step 521. If the threshold is not exceeded, the query engine continues to step 509 to select the next record for evaluation. When all records have been thus evaluated, the 'N' branch is taken from step 512.

Re-evaluation of the primary query strategy is triggered when the evaluation count (EC), i.e., the number of records evaluated, exceeds the loop threshold (T). Where the strategy is an index search strategy, the loop threshold is set to the high water mark value corresponding to the strategy being used, which is obtained from H/L value field 417 in the strategy block 402. An index strategy is optimal when the index eliminates most of the records, leaving a relatively small number of records to be evaluated in the loop of steps 509-514. The high water mark associated with an index strategy expresses an acceptable number of records to evaluate, based on previous experience. In other words, when using an index search strategy, it is expected that the number of records to be evaluated (i.e., the number of records in the list generated at step 508) will not exceed the high water mark. Therefore, if the number of records evaluated actually exceeds the high water mark, there is reason to believe that the index strategy may be less than optimal. Accordingly, if an index strategy is being used (the 'Y' branch from step 521), the query engine will initiate an alternative strategy thread, beginning at step 525.

If, on the other hand, a table scan strategy is being used, it is expected that a relatively large number of records will be evaluated. In this case, the value stored in H/L value field is a low water mark, indicating the minimum number of records to be evaluated. It can not be known whether the actual number of records exceeds the minimum until all or nearly all of the records have been evaluated, by which time it is too late to initiate an alternative process. Therefore, in the case of a table scan, the loop threshold (T) is initially set to a pre-determined sampling value, sufficiently large to obtain a meaningful projected value, but sufficiently small to benefit from launching an alternative strategy. Accordingly, if a table scan strategy is used (the 'N' branch from step 521), the query engine computes a projected number of records which will be selected by extrapolating the proportion to records selected by indexed condition or conditions to the entire database (step 522). I.e., for each indexed condition CondN, the query engine projects that an index scan would evaluate a number of records equal to:

$$TotalRecs * \left[ \frac{Sel(CondN)}{Eval(CondN)} \right]$$

where TotalRecs is the total number of records in the database table being scanned, Eval(CondN) is the number of records for which CondN was evaluated, and Sel(CondN) is the number of records selected by ConditionN (e.g., for which CondN evaluated to 'true', in the case of conditions joined by a logical AND).

If the projected number of records selected by an indexed condition is less than the low water mark, then there is reason to believe that the table scan strategy being used is less than optimal. In this case, the 'Y' branch is taken from step 523, and an alternative strategy thread is initiated, beginning at step 525. If the projected number of records selected by each indexed condition is at least as much as the low water mark, then the table scan is probably the best strategy. In this case, the 'N' branch is taken from step 523. The query engine then adjusts loop threshold (T) to an appropriate value (step 524). The loop threshold must be adjusted to avoid re-evaluation with every loop iteration. The loop threshold T may be adjusted to some value greater than TotalRecs, so that re-evaluation is performed only once. Alternatively, the loop threshold may be adjusted by some fixed incremental amount substantially greater than one, so that re-evaluation is performed periodically during the table scan. The query engine then returns to the table scan at step 509.

Preferably, a simple decision path as described above is used to determine whether to launch an alternative strategy, but such a decision could alternatively consider other or additional factors. For example, it would be possible to estimate the extent of progress in executing the primary query strategy, and to launch an alternative strategy only if the query has not reached a certain progress milestone.

If either branch is taken to step 525, the query engine initiates a thread to execute an alternative strategy. The alternative strategy is initiated and executes as a separate thread, while the original strategy continues to execute. The existence of two concurrently executing threads is indicated by the divergent paths from step 525. The original thread disables the loop threshold by setting it to a sufficiently high value (step 526), so that further re-evaluation of a strategy and launching of additional threads is avoided. The original thread then returns to executing its original strategy at step 509.

The query engine executing the alternative strategy thread determines whether a suitable alternative strategy exists in the query object (step 527). If so, the alternative is selected for execution (step 529); if not, the optimizer is called to generate an alternative strategy (step 528). These steps are similar to steps 504-506, but the alternative strategy must be of a different type (table or index) than the primary strategy already executing.

If the alternative strategy is an index search strategy, the query engine then accesses the index or indexes to derive a list of records satisfying the indexed condition(s) (step 530), as performed in step 508 with respect to the primary strategy.

The query engine then executes the alternative strategy by selecting and evaluating records, as indicated by the loop formed by steps 531-534. This process is analogous to the evaluation loop of the primary strategy represented by steps 509-514, explained above. Steps 531-534 correspond to steps 509-512, respectively. Because the alternative strategy will not be re-evaluated, the alternative strategy thread has no steps corresponding to steps 513 and 514.

When two strategies are concurrently executing as separate threads, the first thread to finish causes the other thread to be killed. This is illustrated in FIG. 5 as steps 515, 516 and 535. I.e., in the case of the primary thread, after all records have been evaluated, the 'N' branch is taken from step 512. If an alternative strategy has been initiated (the 'Y' branch from step 515), this strategy is killed (step 516). In the case of the alternative thread, after all records have been evaluated, the 'N' branch is taken from step 534, and the primary strategy thread is killed (step 535). In either case, the query engine then continues to step 517. Well-known semaphore mechanisms (not shown) are available to prevent both threads, having completed at approximately the same time, from killing each other.

Having completed the evaluation of all applicable records according to at least one of the strategies, the query engine updates strategy information in the query object 206 (step 517). Specifically, with respect to whichever strategy completed first, if the number of records evaluated was higher than the existing high water mark (in the case of an index search strategy), or the number of records selected was lower than the existing low water mark (in the case of a table scan strategy), then the existing high water mark (or low water mark) is adjusted upwards (or downwards) to the value of the number of records evaluated or number of records selected, respectively. If the strategy was a new strategy, then the high or low water marks are set to the corresponding number of records evaluated or number of records selected, respectively. By thus adjusting the high and low water marks associated with different strategies, the high and low water marks will eventually converge to values which reduce unnecessary launching of alternative strategy threads.

The query engine then generates and returns results in an appropriate form (step 518). E.g., where a user issues an interactive query, this typically means returning a list of matching database entries for display to the user. A query from an application program may perform some other function with respect to database entries matching a query.

In the description above, it has been assumed that there could be more than two strategies associated with a single query, and an array of counters $Eval(X)$ and $Sel(X)$ is described. However, in the more typical case, there will be only two major alternative strategies for a query, e.g. one being a table scan and the other being an index search. In this case, the number of counters maintained can be reduced accordingly, and the EC may be combined with $Eval(X)$ as a single counter.

In the exemplary embodiment above, dynamic query re-evaluation is described in the context of a choice between a table scan strategy and an index search strategy. However, it should be understood that this is only one of several possible applications for the dynamic query re-evaluation of the present invention, and that the present invention could be applied to choose between or among other types of queries. Some examples of alternative applications are described below, these being described by way of example and not by way of limitation. In a first alternative example, dynamic query optimization could be used to choose between two (or more) indexes as the basis for respective alternative index search strategies. In this first example, it is generally desirable to use the index search strategy which eliminates the largest number of records from consideration. Each index search strategy contains a respective high water mark. The high water mark associated with the primary index search strategy is monitored (as described above), and the alternative index search strategy is initiated if the primary's high water mark is exceeded. In a second alternative example, the query requires a join of two indexed values from separate tables. In this case, the join order (the order of the tables from which records are selected) can affect the execution performance, in much the same way that choosing from among multiple indexes in the same table can affect performance. As in the first example, a respective high water mark is associated with each index search strategy in each of the tables, or a high water mark may be associated with the entire query. If the primary's high water mark is exceeded during execution, the query engine initiates an alternative strategy by joining in a different order.

Among the advantages of the technique described herein as a preferred embodiment is the relatively low overhead of implementation. It would be possible to re-optimize every query when it is invoked, using the values of any imported variables at the time the query is invoked, but this involves significant overhead. In general, the technique described herein requires only that certain counters be incremented, and that one of these be compared to a loop threshold with each record evaluated. Depending on the database environment, it is possible that the query engine will already maintain such counters, so that the only additional overhead is the comparison to the loop threshold. In the general case where the strategy selected is an optimal one and the high (or low) water marks have converged on stable values, the 'Y' branch to (A) at step 514 will never be taken (in the case of an index strategy) or will be taken only once, resulting in a single instance of computing the projected number selected (in the case of a table scan); in neither case will an alternative strategy be initiated.

In the preferred embodiment, a re-evaluation of the primary execution strategy triggers an alternative execution strategy as a separate, concurrently executing thread. This approach obviously involves some duplication of resource, but is chosen because it is difficult to determine which strategy will complete first, and the overhead of making the re-evaluation determination is low. However, in an alternative embodiment, it would be possible to use more sophisticated indicia of performance to predict, and the time the re-evaluation is triggered, which of the primary or secondary strategies will complete first, and to select that strategy for execution.

In the preferred embodiment described above, the generation and execution of the query is described as a series of steps in a particular order. However, it will be recognized by those skilled in the art that the order of performing certain steps may vary, and that variations in addition to those specifically mentioned above exist in the way particular steps might be performed. In particular, the manner in which queries are written, parsed or compiled, and stored, may vary depending on the database environment and other factors. Furthermore, it may be possible to present the user with intermediate results during the evaluation phase.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as system memory 102, and as data storage devices 125-127.

Although a specific embodiment of the invention has been disclosed along with certain alternatives, it will be recognized by those skilled in the art that additional variations in form and detail may be made within the scope of the following claims:

What is claimed is:

1. A method for executing a database query in a computer system, comprising the steps of:
    invoking a database query, said database query containing at least one imported variable, said step of invoking a database query comprising specifying a respective value of each said at least one imported variable;
    automatically selecting a primary query execution strategy for executing the database query from among a plurality of different query execution strategies for executing the database query, each said query execution strategy being generated by an automated query optimizer and optimized for a different respective set of values of said at least one imported variable;
    executing said database query according to said primary execution strategy;
    automatically monitoring execution of said primary execution strategy while performing said execution step to detect a condition from the set of conditions consisting of:
    (a) a number of records evaluated using said primary execution strategy exceeds a high water mark, said high water mark being a dynamically maintained value indicating the highest number of records evaluated during any of previous successful executions of said primary execution strategy, and
    (b) a projected number of records to be evaluated using said primary execution strategy will be less than a low water mark, said projected number of records being projected during execution of said primary execution strategy using at least some results from execution of said primary execution strategy, said low water mark being a dynamically maintained value indicating the lowest number of records evaluated during any of previous successful executions of said primary execution strategy;
    responsive to detecting a condition from said set of conditions, automatically initiating an alternate execution strategy of said plurality of query execution strategies for executing said database query; and
    outputting results of executing said database query to a user.

2. The method for executing a database query of claim 1, wherein said step of automatically initiating an alternate execution strategy comprises initiating said alternate execution strategy as a separate concurrently executing thread while continuing to execute said database query according to said primary execution strategy.

3. The method for executing a database query of claim 1, wherein said primary execution strategy is an index search strategy.

4. The method for executing a database query of claim 3, wherein said step of automatically monitoring execution of said primary execution strategy comprises monitoring to detect condition (a).

5. The method for executing a database query of claim 3, wherein said alternate execution strategy is a table scan strategy.

6. The method for executing a database query of claim 3, wherein said alternate execution strategy is an index search strategy, said alternate execution strategy using an indexed field other than an indexed field used by said primary search strategy.

7. The method for executing a database query of claim 1, wherein said primary execution strategy is a table scan strategy, and said step of automatically monitoring execution of said primary execution strategy comprises monitoring to detect condition (b).

8. The method of claim 1, further comprising the step of:
    if condition (a) is detected during said step of dynamically monitoring execution and it is subsequently determined that said primary execution strategy was successful, then dynamically adjusting said high water mark to a new value indicating a number of records evaluated during execution using said primary execution strategy.

9. The method of claim 1, further comprising the step of:
    if condition (b) is detected during said step of dynamically monitoring execution and it is subsequently determined that said primary execution strategy was successful, then dynamically adjusting said low water mark to a new value indicating a number of records evaluated during execution using said primary execution strategy.

10. A computer program product for database query optimization comprising:
a plurality of computer executable instructions recorded on tangible computer-readable media, wherein said instructions, when executed by at least one computer system, cause the at least one computer system to perform the steps of:
receiving an invocation of a database query;
assigning a primary query execution strategy to the database query, wherein said primary execution strategy is a table scan strategy;
executing said database query according to said primary execution strategy;
monitoring execution of said primary execution strategy while performing said execution step to detect a condition indicating that said primary execution strategy is sub-optimal, said monitoring execution step including using a non-empty subset of records of a database table already scanned during execution of said database query according to said primary execution strategy to project, at least once during execution of said database query according to said primary execution strategy, whether a number of records selected by a logical condition having an indexed record field within said query will be less than a pre-determined value;
responsive to detecting a condition indicating that said primary execution strategy is sub-optimal, initiating an alternate execution strategy for executing said database query.

11. The computer program product of claim 10, wherein said step of initiating an alternate execution strategy comprises initiating said alternate execution strategy as a separate concurrently executing thread while continuing to execute said database query according to said primary execution strategy.

12. The computer program product of claim 10, wherein said alternate execution strategy is an index search strategy.

13. The computer program product of claim 10, wherein said pre-determined value is a dynamically maintained low water mark indicating a minimum number of records evaluated during any of previous successful executions of said primary execution strategy.

14. The computer program product of claim 10, wherein said step of monitoring execution of said primary execution strategy comprises maintaining separate counts of a number of records evaluated for a first condition of said query using said primary execution strategy and a number of records satisfying said first condition of said query using said primary execution strategy.

15. The computer program product of claim 14, wherein said projecting a number of records selected by a logical condition having an indexed record field within said query comprises computing a ratio of said number of records evaluated for said first condition of said query using said primary execution strategy to said number of records satisfying said first condition of said query using said primary execution strategy.

16. A computer system, comprising:
at least one processor;
a data storage for storing a database; and
a database management facility embodied as a plurality of instructions executable on said at least one processor, said database management facility including a query engine which executes logical queries against said database and a query optimizer for generating execution strategies for execution logical queries against said database, wherein for a first said logical query containing at least one imported variable, said query optimizer generates a plurality of different query execution strategies, each said query execution strategy being optimized for a different respective set of values of said at least one imported variable;
wherein said database management facility automatically selects a primary execution strategy from among said plurality of different query execution strategies generated by said query optimizer for executing an invoked database query, monitors execution of said primary execution strategy to detect a condition indicating that said primary execution strategy is sub-optimal, and initiates an alternate execution strategy from among said plurality of different query execution strategies generated by said query optimizer responsive to detecting a condition indicating that said primary execution strategy is sub-optimal
wherein said condition indicating that said primary execution strategy is sub-optimal comprises a condition from the set of conditions consisting of:
(a) a number of records evaluated using said primary execution strategy exceeds a high water mark, said high water mark being a dynamically maintained value indicating the highest number of records evaluated during any of previous successful executions of said primary execution strategy, and
(b) a projected number of records to be evaluated using said primary execution strategy will be less than a low water mark, said projected number of records being projected during execution of said primary execution strategy using at least some results from execution of said primary execution strategy, said low water mark being a dynamically maintained value indicating the lowest number of records evaluated during any of previous successful executions of said primary execution strategy.

17. The computer system of claim 16, wherein a respective high water mark is associated with each said query execution strategy generated by said automated query optimizer, each respective high water mark indicating the highest number of records evaluated during any of previous successful executions of the query execution strategy with which it is associated.

18. The method of claim 1, further comprising the step of generating and saving a plurality of said different query execution strategies for executing said database query with said automated query optimizer, each saved query execution strategy including respective condition data indicating at least one condition for which the respective query is optimized.

19. The method of claim 18, wherein each said saved query execution strategy further includes a respective dynamically maintained high water mark, each respective high water mark indicating the highest number of records evaluated during any of previous successful executions of the query execution strategy with which it is associated.

* * * * *